O. H. HINDS.
SPRING WHEEL.
APPLICATION FILED SEPT. 6, 1912.
1,063,161.
Patented May 27, 1913.
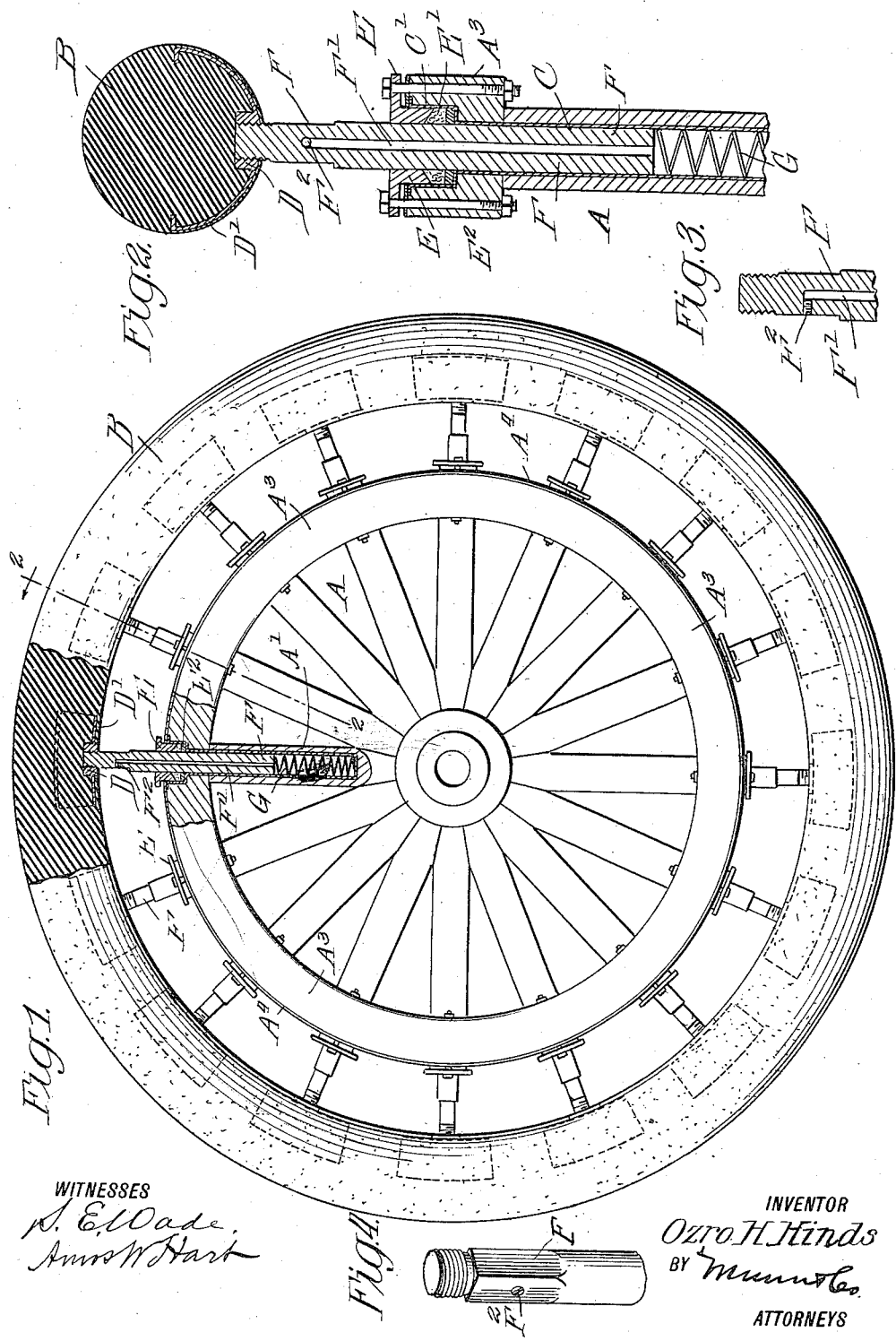

UNITED STATES PATENT OFFICE.

OZRO H. HINDS, OF LE MARS, IOWA.

SPRING-WHEEL.

1,063,161.  Specification of Letters Patent.  Patented May 27, 1913.

Application filed September 6, 1912. Serial No. 718,893.

*To all whom it may concern:*

Be it known that I, OZRO H. HINDS, a citizen of the United States, and a resident of Le Mars, in the county of Plymouth and State of Iowa, have invented certain new and useful Improvements in Spring-Wheels, of which the following is a specification.

This invention is an improvement in wheels and particularly in spring wheels, and consists in certain novel constructions and combinations of parts as will be hereinafter described and claimed.

In the drawing Figure 1 is a side elevation, partly in section, of a portion of a wheel embodying my invention. Fig. 2 is a cross section on about line 2—2 of Fig. 1. Fig. 3 is an enlarged section of the outer end portion of a spoke. Fig. 4 is a perspective view of the outer end of one of the piston spokes.

In carrying out the invention, I form the wheel with what may be termed a rigid body portion A and a concentric but radially movable tire portion B. The body portion A has radial hollow spokes A' and these are lined by metal tubes or casings having cylindrical portions C which extend within the hollow spokes and cup-like portions C' which fit within the rim portion $A^3$ of the body A. A steel band $A^4$ is shrunk on the rim or felly $A^3$, and strengthens the whole wheel.

Piston spokes F are adapted to slide in the sockets A' of the inner wheel A, and are connected at their outer ends with the tire B by threading them into sockets formed in the thickened portions D of plates D' which are curved in both cross section and longitudinal section to conform to the inner side of the elastic tire B, as shown in Figs. 1 and 2. These several plates D are entirely separate from each other, and of course correspond in number with the spokes of which there are usually sixteen. The portion of the piston spokes which is adjacent to the screw thread thereon is squared, as shown in Fig. 4, for application of a wrench to insert or remove the spokes.

A stuffing-box is provided for each spoke socket, the same being formed of the usual gland E held adjustably by screw bolts and pressing upon plastic packing E' held in the cup-like portion C' of the spoke tubes or casings C. The gland is shown crosswise of the inner wheel rim $A^3$, but it may be of course arranged lengthwise thereof. Beneath such packing is a brass ring $E^2$ which fits closely around the spoke and within the cup C', and forms an important attachment of the same. Both the casing C, C', and the ring $E^2$ are adapted to be easily removed, which is done whenever they become worn to a degree impairing their efficiency. Upon being drawn out, new ones may be readily substituted, thus practically producing a new wheel, so far as relates to this portion of the structure.

Springs G bear between the inner ends of the cylinders C and the inner ends of the piston spokes F and operate to yieldingly support the said spokes and to press the tire B normally outward. I find it advisable to lubricate the cylinders C and to this end, I form the piston spokes with longitudinal bores F' which open at their inner ends at the inner ends of the piston spokes and have at their outer ends lateral ports $F^2$ which may be closed when desired by a screw plug $F^3$, such ports $F^2$ forming filling openings for supplying oil to the spokes to secure the lubrication, as before described.

It is apparent that when weight is applied to the wheel as a whole, the elastic tire B is pressed inward or contracted, and the adjacent spoke or spokes F being formed inward correspondingly, and as the wheel rotates, such depression and contraction travels around the tire, the spokes F being thus successively forced inward against the tension of their springs G.

In carrying out the invention in practice, the body of the wheel may be made of wood suitably reinforced with metal and its spokes may also be made of wood and contain metallic casings with the cylinder portions and the entire construction may be cheaply constructed and efficiently serve the purpose for which it is designed.

What I claim is:—

1. The improvement in wheels herein described comprising the combination of an outer elastic tire and an inner rigid body portion having hollow spokes and a rigid rim portion and metal cylindrical casings fixed in such spokes and having cup-like outer portions seated in the rim and felly portion of the body, stuffing-boxes applied to the outer ends of said hollow spokes, piston spokes secured at their outer ends to the elastic tire and extending thence into the respective spokes of the body portion, said piston spokes having longitudinal bores forming an oil passage and having lateral ports communicating with the outer ends of said passages, means for closing said ports, and springs within the hollow body spokes and operating upon the inner ends of the slidable piston spokes, substantially as set forth.

2. The improvement in spring wheels herein described, comprising an inner rigid body portion having hollow spokes, metal casings lining said spokes and having cup-like portions at their outer ends, packing in said cups, a gland compressing the same, and a metal ring arranged beneath the packing, and piston spokes operating within the casings, said piston spokes having lubricating passages, means whereby oil may be supplied thereto, and springs arranged within the hollow bodies of the spokes, as described.

OZRO H. HINDS.

Witnesses:
JOHN M. AUER,
MEL J. SPAID.

Copies of this patent may be obtained for five cents each, by addressing the "Commissioner of Patents, Washington, D. C."